United States Patent [19]

Ferguson

[11] Patent Number: 4,551,115

[45] Date of Patent: Nov. 5, 1985

[54] DRIVESHAFT COUPLING WITH ELASTOMER DAMPER

[75] Inventor: Robert J. Ferguson, Marshall, Mich.

[73] Assignee: Simpson Industries, Inc., Litchfield, Mich.

[21] Appl. No.: 613,197

[22] Filed: May 23, 1984

[51] Int. Cl.⁴ ............................................. F16D 3/10
[52] U.S. Cl. .................................... 464/83; 464/160; 464/180
[58] Field of Search ...................... 464/83, 85, 87, 89, 464/160, 180

[56] References Cited

U.S. PATENT DOCUMENTS

| | | | |
|---|---|---|---|
| 2,691,283 | 10/1954 | Stover | 464/180 X |
| 2,712,742 | 7/1955 | Neidhart | 464/83 |
| 2,724,770 | 11/1955 | Onksen, Jr. | 240/90 |
| 2,857,974 | 10/1958 | Heller | 180/70 |
| 3,055,687 | 9/1962 | Hutton | 403/221 |
| 3,408,830 | 11/1968 | Sutaruk et al. | 464/180 X |
| 3,808,838 | 5/1974 | Bowen et al. | 464/89 |
| 3,837,610 | 9/1974 | Ewers | 248/374 |
| 3,878,695 | 4/1975 | Pitner | 464/89 |
| 4,020,651 | 5/1977 | Callies | 464/91 X |
| 4,197,759 | 4/1980 | Krebs et al. | 74/447 |
| 4,269,043 | 5/1981 | Kizu et al. | 464/83 |
| 4,406,640 | 9/1983 | Franklin et al. | 464/91 |

Primary Examiner—Stuart S. Levy
Assistant Examiner—Daniel P. Stodola
Attorney, Agent, or Firm—Beaman & Beaman

[57] ABSTRACT

A driveshaft coupling particularly suitable for vehicles characterized by its vibration damping ability. Drive and driven members in concentric relationship about an axis of rotation include spaced non-concentric surfaces between which elastomer elements are located. Relative rotation between the members compresses the elastomers to transfer torque. The members also include engageable abutment surfaces directly transferring torque metal-to-metal upon the occurrence of predetermined elastomer deformation.

2 Claims, 5 Drawing Figures

DRIVESHAFT COUPLING WITH ELASTOMER DAMPER

BACKGROUND OF THE INVENTION

Automobile driveshafts as used between the transmission and differential of rear wheel drive vehicles transmit vibrations occurring in the differential, or transmission, resulting in noisy operation. Also, with automatic transmission, clunking and sudden torque transfer vibrations often occur during shifting between forward and rear gear selections.

It has been discovered that many of the objectionable vibrations occurring in vehicle drive train systems can be eliminated by damping, and various types of dampers have been developed for this purpose. For instance, vibration damping in resilient elements are shown in U.S. Pat. Nos. 3,878,695; 4,197,759 and 4,406,640.

Attempts have been made to dampen vibrations in driveshafts and drive lines as shown in U.S. Pat. Nos. 2,857,974 and 4,020,651. However, previous torque transmitting couplings of this type have not been able to effectively withstand the highly adverse operating conditions wherein high torques must be transmitted, and conventional systems wherein elastomers are bonded to metal components are not capable of achieving the dependability required in this environment.

It is an object of the invention to provide a driveshaft coupling capable of damping vibrations over an extended frequency range, and wherein the coupling is capable of transmitting high torque forces without adverse wear and deterioration.

Another object of the invention is to provide a driveshaft coupling suitable for vehicle use capable of absorbing vibrations over a wide frequency range wherein elastomer elements are utilized and torque is transmitted by compression of the elastomer.

Yet another object of the invention is to provide a driveshaft coupling utilizing compressible elastomer elements for vibration damping purposes and lost motion metal-to-metal surfaces are employed to transmit torque upon predetermined elastomer deformation occurring.

A further object of the invention is to provide a driveshaft coupling of concise configuration capable of damping vibrations and wherein the coupling has a configuration and size similar to previously employed similar components having no vibration damping capabilities.

In the practice of the invention, an elongated drive member comprising a portion of a universal joint includes an elongated rectangular portion of a square transverse sectional configuration. This rectangular section is in radial alignment with a tubular driven member having a square transverse section and the flat surfaces of the drive and driven members are in spaced parallel relationship. An elastomer element or pad is interposed between each set of parallel opposed flat surfaces. Preferably, the elastomer is under precompression.

Torque is transmitted from the drive member to the driven member by the tendency of the dimensions between the opposed surfaces to change, which will compress portions of the elastomer and thereby transmit torque. Accordingly, the torque is transmitted only through elastomer under compression eliminating any tendency for the elastomer to be subjected to tension forces.

Metal-to-metal engagement between the drive and driven members occurs upon excessive torque forces being produced. In such event a "lost motion" exists relative to the metal-to-metal drive between the drive and driven members such that such positive engagement occurs only after maximum compression of the elastomers occurs.

The construction of the coupling is such that similar torque transmitting capabilities exist in either direction of rotation of the drive and driven members, and the coupling is so fabricated as to be easily assembled, and readily manufactured at reasonable cost.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
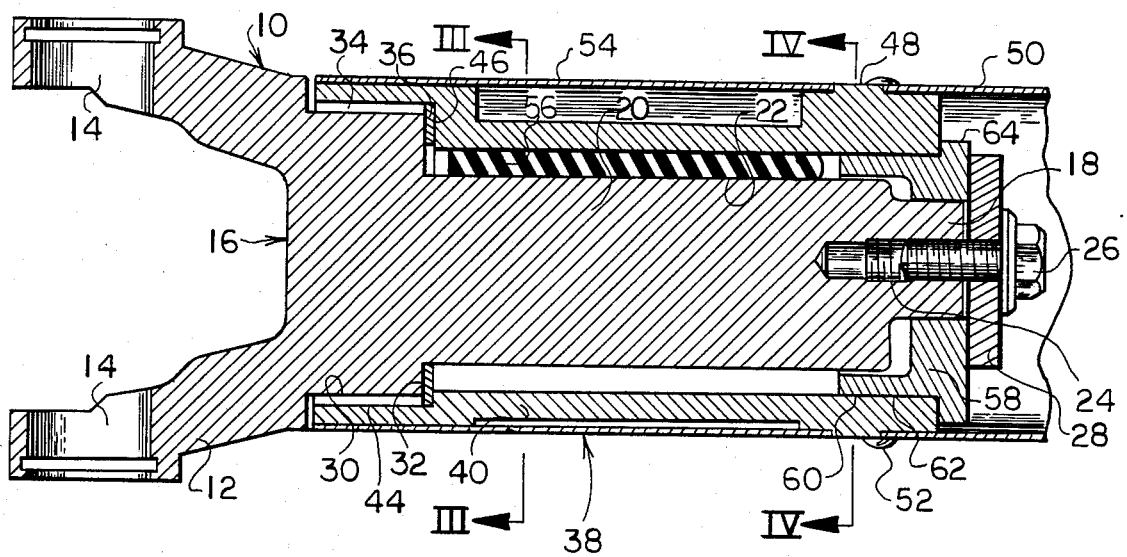
FIG. 1 is a sectional view of a driveshaft coupling in accord with the invention, as taken along Section I—I of FIG. 3.

With reference to FIG. 1, the drive member is represented at 10. The drive member is of an elongated configuration, and the left end thereof comprises a yoke 12 for a conventional universal joint as commonly used in vehicle drive train systems. The joint, not shown, is received within the yoke openings 14 in the well known manner.

Figure 3:
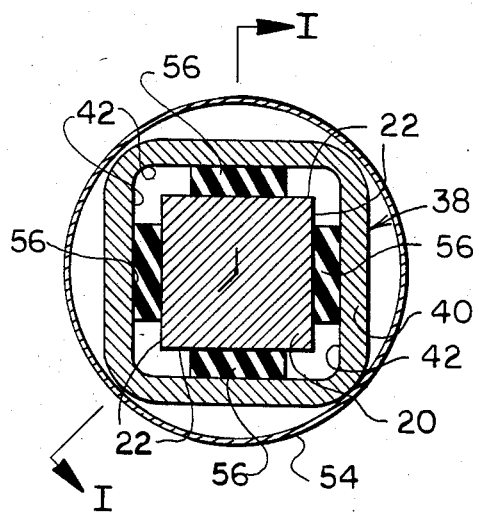
FIG. 3 is an elevational, sectional view as taken along Section III—III of FIG. 1.
Figure 4:
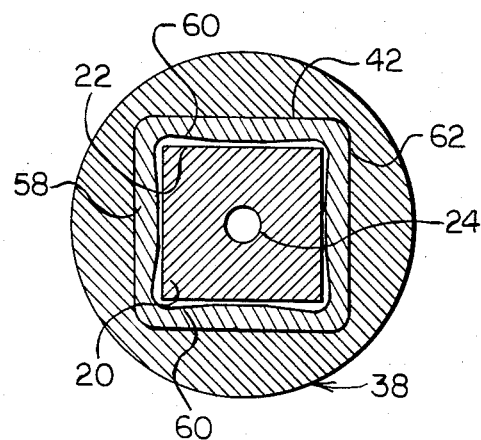
FIG. 4 is an elevational, sectional view as taken along Section IV—IV of FIG. 1.
Figure 2:
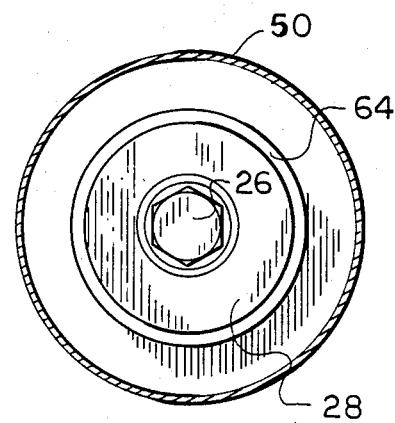
FIG. 2 is an end elevational view as taken from the right end of the coupling of FIG. 1.

The drive member section 16 is of an elongated form having a cylindrical reduced diameter stub 18, and a stem 20 of square configuration as will be appreciated from FIGS. 3 and 4. The stem 20 is defined by four flat surfaces 22 disposed at 90° to the adjacent surface. The stem end is provided with a threaded bore 24 receiving the bolt 26 and retainer 28 for a purpose later described.

The drive member is also provided with a cylindrical surface at 30, and a flat radial surface 32, and these surfaces are provided with a cylindrical bearing sleeve 34, and a thrust bearing washer 36, respectively.

The driven member 38 is of a tubular configuration and of a length substantially corresponding to that of the section 16 of the drive member 10. The member 38 includes a primary section 40 having a square inner surface defined by the flat surfaces 42, and as will be appreciated from FIG. 3, the flat surfaces 42 are each in a radially spaced parallel relationship to the drive member surface 22 wherein the opposed surfaces define a set.

The driven member 38 includes a cylindrical surface 44 engaging the sleeve bearing 34, while the radial surface 46 engages the thrust washer 36. Externally, the driven member includes a circumferential boss 48 against which the drive tube or propeller shaft 50 abuts and is welded thereto by bead 52. In this manner the driven member is attached to the tube 50 for transmitting torque to the attached component. Usually, a universal joint is attached to the other end of the propeller shaft, not shown.

For appearance purposes, a cover tube 54 may be attached to the exterior of the driven member to produce a cylindrical uniform appearance.

An elastomer element or pad is interposed between each set of opposed flat surfaces 22 and 42 defined on the drive and driven members. The elastomer pads 56, FIG. 3, are of a length substantially corresponding to the rectangular configuration defined on the stem 20 as will be appreciated from FIG. 1, and preferably, the elastomers are under a precompression wherein significant frictional engagement exists between the elastomer and its engaged confining surfaces of the drive and driven members. The width of the elastomers in a circumferential direction with respect to the axis of coupling rotation is sufficient to assure that a significant portion of the elastomer will be under compression during torque transmission, and in this respect, it is desirable that the elastomer be of a width only slightly less than the width of the flat surfaces 22.

An insert 58 is mounted upon the stem 20 and retained thereon by the retainer washer 28 and bolt 26. The insert has an internal substantially rectangular configuration as will be apparent from FIG. 4 wherein four inner surfaces 60 are radially spaced with respect to the drive member surfaces 22. The surfaces 60 are of a modified inwardly convex form as best appreciated from FIGS. 4 and 5.

Externally, the insert 58 is defined by four flat surfaces 62 which are snugly received within the rectangular bore of the tube driven member 38, and flange 64 prevents axial displacement of the driven member on the drive member. It is to be appreciated that relative rotational movement of the insert 58 to the driven member 38 about the axis of coupling rotation is prevented due to the close fit between the surfaces 42 and the surfaces 62.

In operation, rotation of the drive member 10 about the coupling axis of rotation will compress approximately one half of the elastomer within each elastomer element 56. For instance, as viewed in FIG. 3, clockwise rotation of the stem 20 compresses the "trailing" left half of the elastomer elements throughout their length. Of course, this elastomer compression is due to tendency of the left half of the flat surfaces 22 to move closer to the flat surfaces 42 due to the resistance of the driven member 38 to move in the same direction of rotation as the drive member. This compression of the elastomer rotates the driven member transferring torque thereto establishing a torque transmitting relationship between the drive and driven members solely through the elastomer. Accordingly, the vibration damping characteristics of the elastomer absorb vibrations within either the drive or driven members and prevents transmission of such vibrations therebetween.

The use of the bearing 34 maintains the "concentricity" of the driven member upon the drive member, and the thrust washer 36 permits the relative rotation between the members to occur as the elastomer is compressed.

In the event that very high torque transmission forces are imposed upon the coupling, the dimensional clearances between insert 58 and the stem 20 are such that direct metal-to-metal contact between the stem and the insert occurs preventing further compression of the elastomer, and preventing damage to the elastomer due to overcompression.

Figure 5:
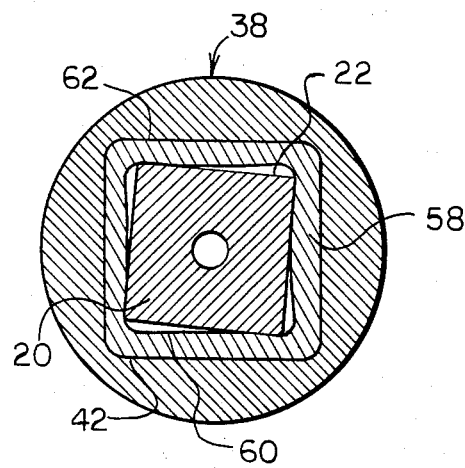
FIG. 5 is a view similar to FIG. 4 illustrating metal-to-metal engagement between the drive and driven members under maximum torque transmission conditions.

As will be appreciated from FIG. 5, the configuration of the insert surfaces 60 produces a "lost motion" with respect to relative rotation between the drive and driven members, and engagement between the stem and inserts, as shown in FIG. 5, only occurs when the clearances have been overcome due to relative rotation of the components. The metal-to-metal contact between the stem and insert may occur during vehicle acceleration and braking, but during the majority of the duration of power transmission, torque will solely be transferred through the elastomer and the transmission of vibration damped.

As the elastomers need not be bonded to the drive or driven members, and as the forces transmitted through the elastomer elements are compression forces, damage to the elastomers is prevented, and construction of a coupling in accord with the inventive concepts results in a coupling having a long operative life.

It is appreciated that various modifications to the inventive concepts may be apparent to those skilled in the art without departing from the spirit and scope thereof, for instance, the drive member 10 may be the driven member of power is applied to the member 38.

I claim:

1. A driveshaft coupling characterized by its vibration damping characteristics comprising, in combination, an elongated drive member having an axis of rotation, an outer end, an inner end, and an elongated central stem, a universal joint receiving yoke defined upon said outer end, said stem having four first flat surfaces extending the length thereof defining a rectangular transverse cross section and each surface having a width and length, an elongated tubular driven member surrounding said stem having an internal bore, an outer end and an inner end located adjacent said drive member inner end, said driven member internal bore comprising four second flat surfaces extending the length of said stem defining a rectangular transverse cross section complementary to said drive member transverse cross section, each first flat surface being in opposed radially spaced substantially parallel relationship to a second flat surface, an elastomer pad interposed between opposed flat surfaces each having a width, length and normal non-compressed radial thickness, the width of said pads being slightly less than the width of said first flat surfaces and said opposed first and second surfaces being radially spaced from each other a distance less than said normal pad radial thickness whereby said pads are under compression, a propeller shaft concentrically affixed to said driven member, a radially disposed thrust bearing interposed between said outer ends of said drive and driven members, a metal insert mounted upon said drive member inner end and maintained thereon by fastening means, said insert engaging said driven member inner end axially forcing said driven member toward said thrust bearing, said insert including means for preventing axial displacement of said driven member relative to said drive member and an axially extending tubular portion having flat outer surfaces complemental to and closely engaging said second surfaces preventing relative rotation between said insert and said driven member, said tubular portion further having rectangularly related inner surfaces in opposed radially spaced relation with said first surfaces, the radial spacing between opposed inner surfaces and said first surfaces being less than the radial spacing between said first and second surfaces whereby said first and inner surfaces are engageable upon a predetermined relative rotational movement between said drive and driven members to establish a direct torsional driving relationship between said drive and driven members.

2. In a driveshaft coupling as in claim 1, said insert inner surfaces being of a slight convex configuration in the direction of the width of said first surfaces.

* * * * *